March 24, 1925.                J. M. MEREDITH, JR                1,530,843
APPARATUS FOR REPAIRING PNEUMATIC TUBES
Filed Sept. 4, 1924
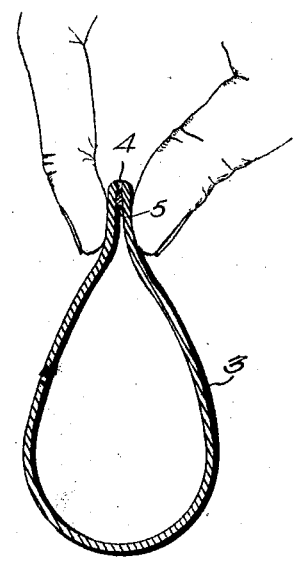
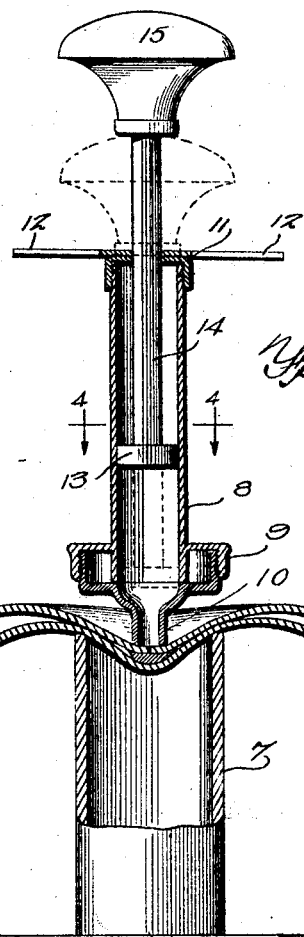
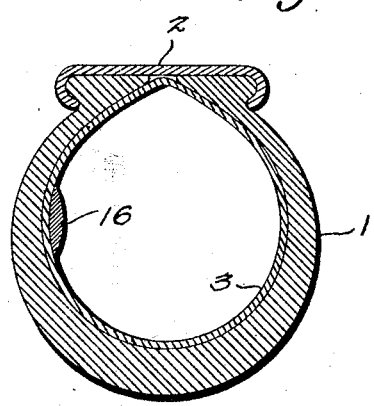
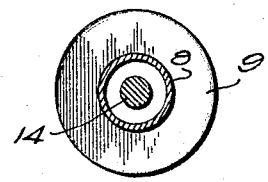
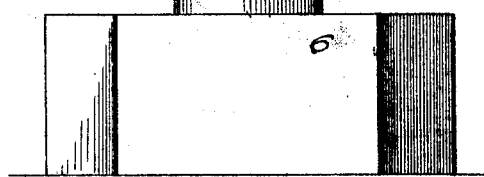
Inventor
JAQUELIN M. MEREDITH Jr.
By  Ch. Parker
Attorney Patented Mar. 24, 1925.

1,530,843

UNITED STATES PATENT OFFICE.

JAQUELIN M. MEREDITH, JR., OF NORFOLK, VIRGINIA, ASSIGNOR OF ONE-HALF TO BENJAMIN B. SHEPPARD, OF WASHINGTON, DISTRICT OF COLUMBIA.

APPARATUS FOR REPAIRING PNEUMATIC TUBES.

Application filed September 4, 1924. Serial No. 735,932.

*To all whom it may concern:*

Be it known that I, JAQUELIN M. MEREDITH, Jr., a citizen of the United States, residing at Norfolk, in the county of Norfolk and State of Virginia, have invented certain new and useful Improvements in Apparatus for Repairing Pneumatic Tubes, of which the following is a specification.

This invention relates to apparatus for repairing pneumatic tubes, such as inner tubes of automobile tires.

An object of the invention is the provision of means for delivering a semi-plastic, self-vulcanizing compound to the portion of the tube surrounding the hole or opening to be repaired.

A further object of the invention is the provision of a support whereby material delivered under pressure will be confined to the area surrounding the opening and will harden to close said opening.

In the accompanying drawings, I have shown one embodiment of the invention. In this showing:

Figure 1 is a partial front elevation and partial sectional view of the apparatus showing the tube being repaired, Figure 2 is a sectional view of the tube showing the application of the cement thereto, Figure 3 is a cross sectional view of a tire showing a patch applied, and, Figure 4 is a horizontal sectional view on line 4—4 of Figure 1.

Referring to the drawings, the reference numeral 1 designates a tire casing of the usual construction adapted to be mounted on a rim 2, and to receive an inner tube 3. In Figure 2 of the drawings, I have shown an inner tube having a hole or opening 4 to be repaired. In repairing the tube, a self-vulcanizing compound is adapted to be forced through the hole 4 to the interior of the tube and caused to adhere to its inner surface, surrounding the opening. It is first necessary to apply a cement to the portion of the tube surrounding the opening to cause the self-vulcanizing material to adhere to the wall of the tube. The cement is forced through the opening 4 in any suitable manner, as indicated at 5 in Figure 2 of the drawings, and the tube is then moved back and forward between the fingers of the operator, as indicated, to spread it over the wall of the tube. The tube is then ready for the application of the patch.

The apparatus employed in placing the patch in the tube, which forms the subject matter of the invention is shown in Figure 1 of the drawings and consists of a base 6, having an upstanding tubular member 7 arranged thereon. As shown, the tubular member acts as a support for the tube being repaired. The self-vulcanizing material is adapted to be arranged within a cylinder 8. A member 9 is arranged on the lower end of the cylinder. The member 9 is internally threaded and these threads are adapted to engage external threads formed on the upper end of a nozzle 10, which is thus held on the lower end of the cylinder. The upper end of the cylinder is closed by a cap 11, having arms 12 projecting on opposite sides. A piston or plunger 13 is arranged within the cylinder and is provided with a piston rod 14, projecting through the cap. A handle or knob 15 is secured to the piston rod in any suitable manner, as by means of the threads (not shown).

In operation, the tube is first prepared for vulcanization as heretofore described, and a suitable amount of a self-vulcanizing compound is placed in the lower end of the cylinder, beneath the plunger. The nozzle 10 is then secured to the member 9, and with the parts in the position shown in Figure 1 of the drawings, the plunger is forced downwardly to expel the material from the cylinder through the opening in the tube. Due to the fact that the cement is confined to the space surrounding the opening in the tube, the self-vulcanizing compound covers the wall of the tube adjacent this opening and hardens. The application of pressure in forcing the material from the cylinder causes the inner tube to assume the depressed position shown in Figure 1 of the drawings, and forms a knob-shaped patch 16, as shown in Figure 3. The diameter of the member 9 is preferably slightly greater than the diameter of the tubular supporting member 7, which prevents the device from forcing the tube into the supporting member beyond a predetermined distance.

It is to be understood that the form of my invention herewith shown and described is to be taken as a preferred example of the same, and that various changes in the shape, size, and arrangement of parts may be resorted to without departing from the spirit of the invention or the scope of the subjoined claims.

I claim:

1. In a device of the character described, a hollow supporting member adapted to receive and support a tube to be repaired, a cylindrical member, and means for delivering a self-vulcanizing material from said cylindrical member under pressure, to force it through an opening in said tube.

2. In a device of the character described, a hollow supporting member adapted to receive and support a tube to be repaired, a cylindrical member, a nozzle arranged on the lower end of said member, and means for delivering a self-vulcanizing material from said cylindrical member through said nozzle whereby said material will be forced through an opening in said tube.

3. In a device of the character described, a hollow supporting member adapted to receive and support a tube to be repaired, a cylindrical member, a nozzle arranged on the lower end of said member, and a plunger in said cylindrical member adapted to force a self-vulcanizing material through said nozzle whereby said material will enter an opening in said tube.

4. In a device of the character described, a hollow supporting member adapted to receive and support a tube to be repaired, a cylindrical member, a nozzle arranged on the lower end of said member, a plunger in said cylindrical member adapted to force a self-vulcanizing material through said nozzle whereby said material will enter an opening in said tube, and means for limiting the movement of said cylindrical member into said supporting member.

5. A supporting device for use in repairing pneumatic tubes comprising a base, and a hollow standard mounted on said base, said standard being provided with an open upper end over which the portion of a tube to be repaired is adapted to be stretched.

In testimony whereof, I affix my signature in presence of two witnesses.

JAQUELIN M. MEREDITH, Jr.

Witnesses:
H. G. AVERY,
B. E. OBERNDERFER.